Figure 1:
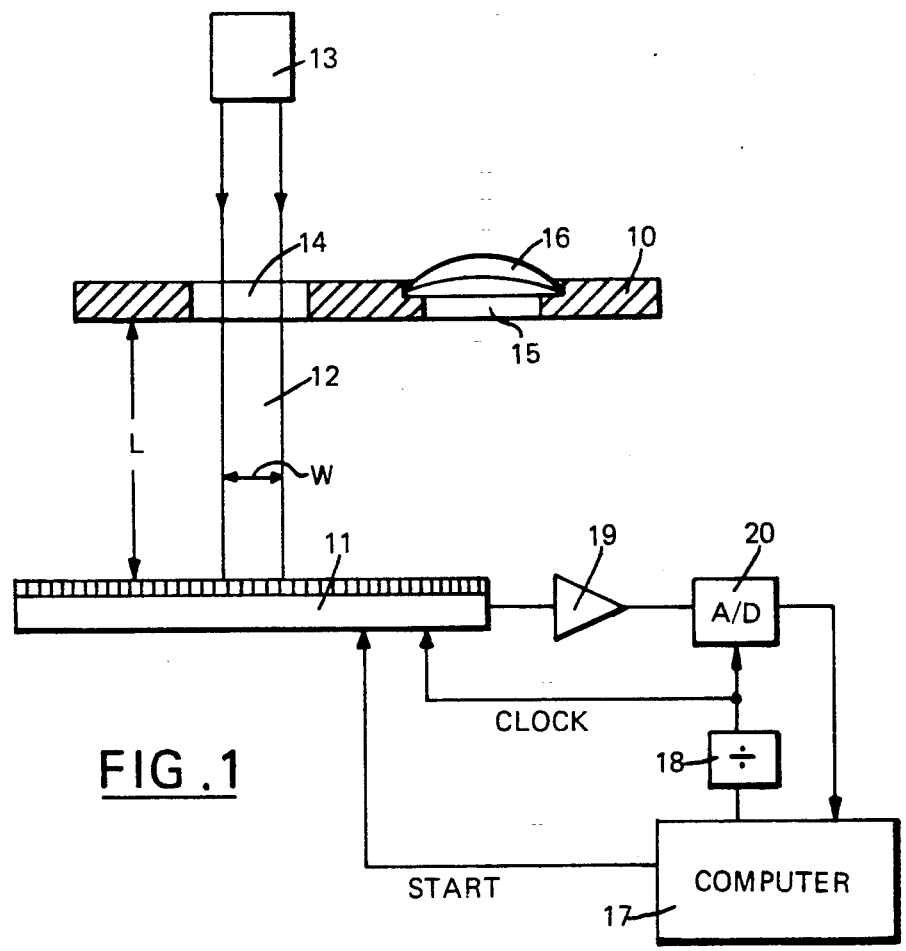

United States Patent [19]

Hegarty

[11] Patent Number: 5,123,735
[45] Date of Patent: Jun. 23, 1992

[54] METHOD OF MEASURING THE POWER OF A LENS

[75] Inventor: John Hegarty, Dublin, Ireland

[73] Assignee: Bausch & Lomb Incorporated, Rochester, N.Y.

[21] Appl. No.: 424,760

[22] Filed: Oct. 23, 1989

[30] Foreign Application Priority Data

Oct. 25, 1988 [IE] Ireland .................. 3227/88

[51] Int. Cl.$^5$ .............................................. G01B 9/00
[52] U.S. Cl. ................................................... 356/125
[58] Field of Search .............. 356/124, 125, 126, 127, 356/121, 244, 246

[56] References Cited

U.S. PATENT DOCUMENTS

| | | | |
|---|---|---|---|
| 3,375,754 | 4/1968 | Kugler | 356/125 |
| 3,612,885 | 10/1971 | Arnaud | 356/121 |
| 3,880,525 | 4/1975 | Johnson | 356/127 |
| 4,275,964 | 6/1981 | Vassiliadis | 356/127 |
| 4,523,842 | 6/1985 | Allen et al. | 356/125 |
| 4,534,645 | 8/1985 | Nohda | 356/127 |
| 4,696,569 | 9/1987 | Geary et al. | 356/124 |

FOREIGN PATENT DOCUMENTS

| | | | |
|---|---|---|---|
| 0127129 | 5/1988 | Japan | 356/121 |
| 507796 | 4/1974 | U.S.S.R. | 356/125 |

Primary Examiner—Richard A. Rosenberger
Assistant Examiner—Hoa Pham

[57] ABSTRACT

A method for measuring the power of a lens, comprising the following steps:
(a) providing an unobstructed collimated beam of light to an opto-electronic transducer,
(b) sampling the beam with said opto-electronic transducer to produce an output signal representing the intensity of light across the width of said collimated beam of light,
(c) converting the transducer output signal to digital form and loading the resulting digital signal into a computer memory,
(d) inserting a lens into the path of said collimated beam of light,
(e) repeating steps (b) and (c) with the lens thus inserted into said beam for at least one separation distance, L, between said lens and said transducer, and
(f) calculating the power of said lens from the digital signals stored in the computer memory.

3 Claims, 5 Drawing Sheets

METHOD OF MEASURING THE POWER OF A LENS

This invention relates to a method of measuring the power of a lens, for example a contact lens.

According to the present invention, there is provided a method of measuring the power of a lens, comprising the following steps:
(a). providing a collimated beam of light,
(b). sampling the beam with an opto-electronic transducer to produce an output signal representing the intensity of light across the width of the beam,
(c). converting the transducer output signal to digital form and loading the resulting digital signal into a computer memory,
(d). inserting a lens into the path of the beam,
(e). repeating steps (b) and (c) with the lens thus inserted for at least one separation distance between the lens and the transducer, and
(f). calculating the power of the lens from the digital signals stored in the computer memory.

Preferably, step (e) is repeated for a plurality of different separation distances between the lens and the transducer.

The opto-electronic transducer may comprise a linear array of photodetectors.

Figure 2:
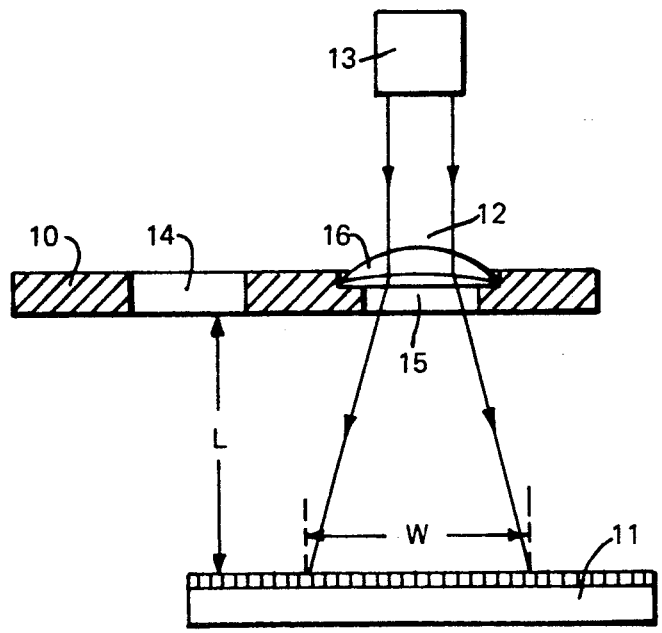
Figure 3A:
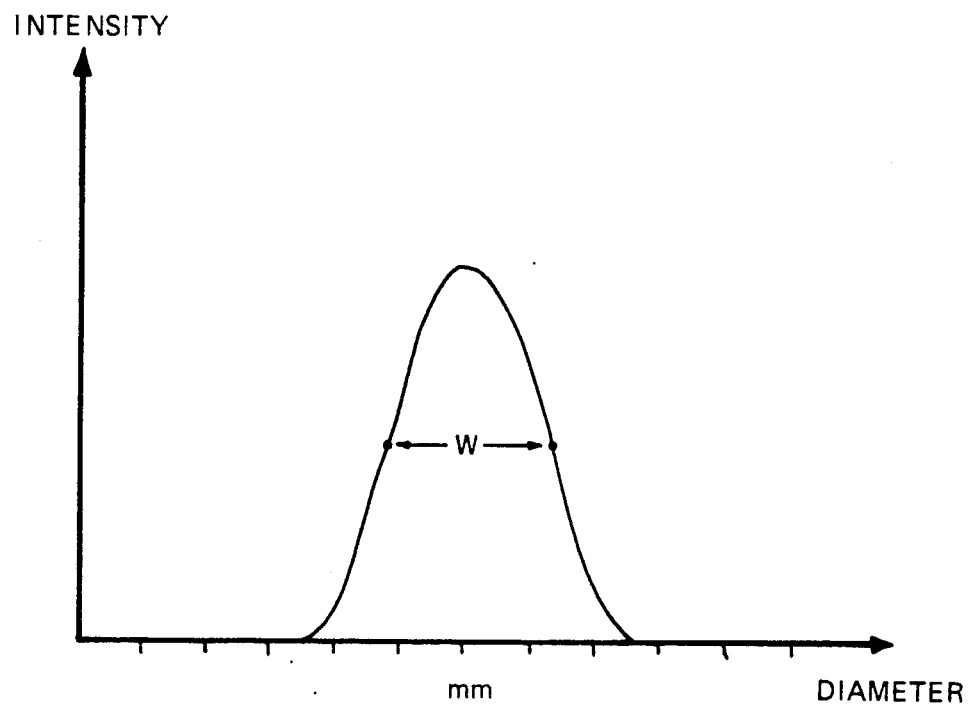
Figure 3B:
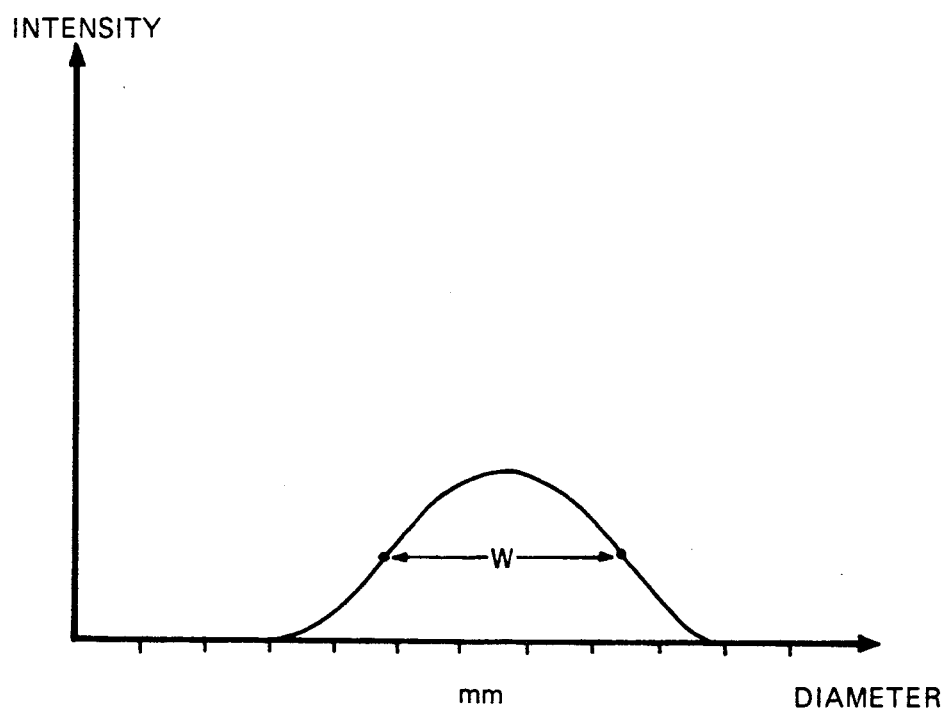
Figure 4A:
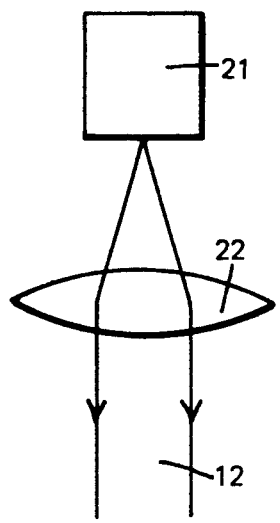
Figure 4B:
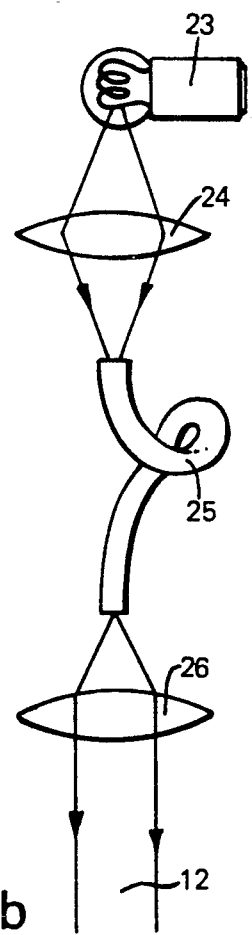
Figure 5:
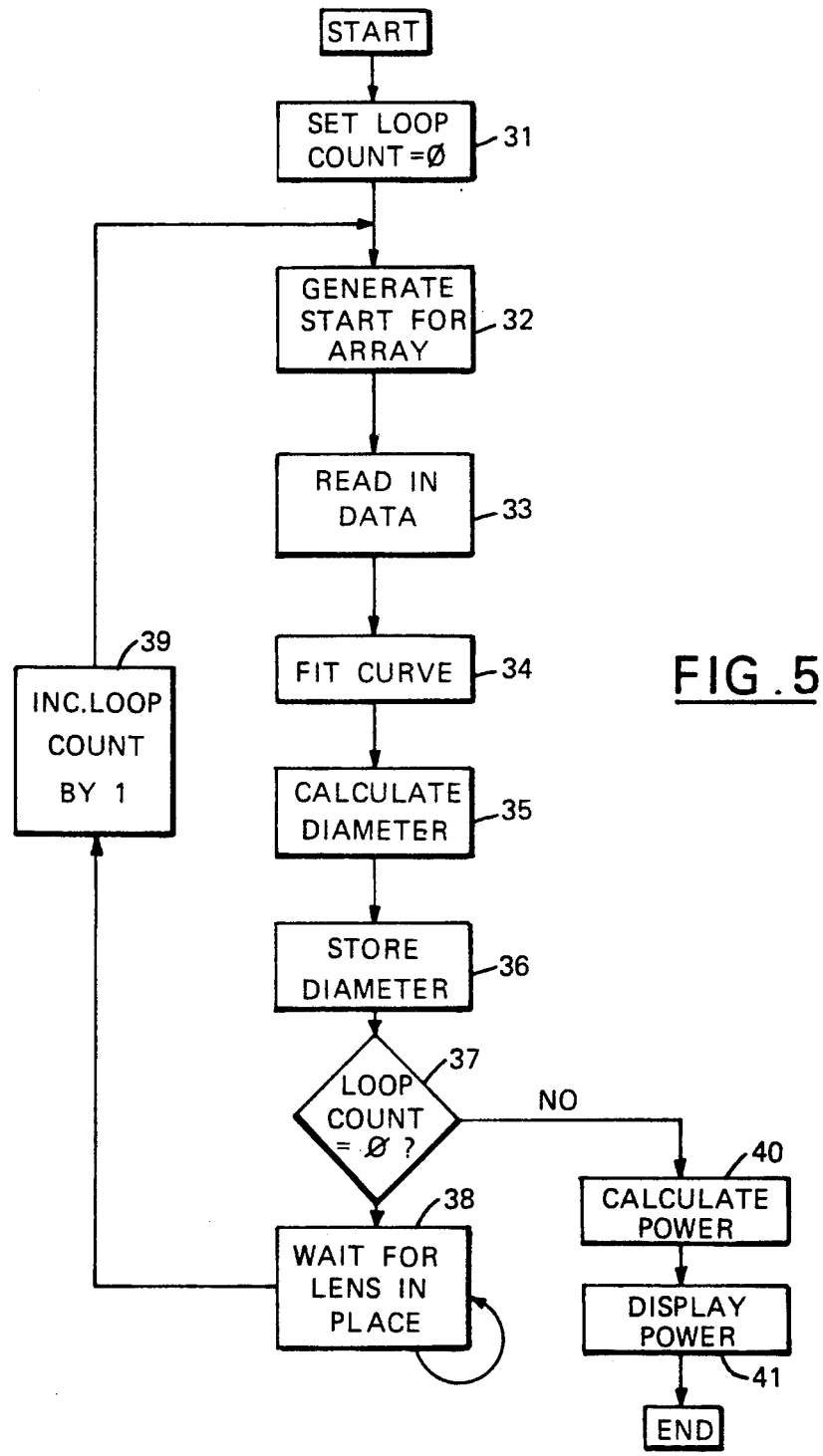
Figure 6:
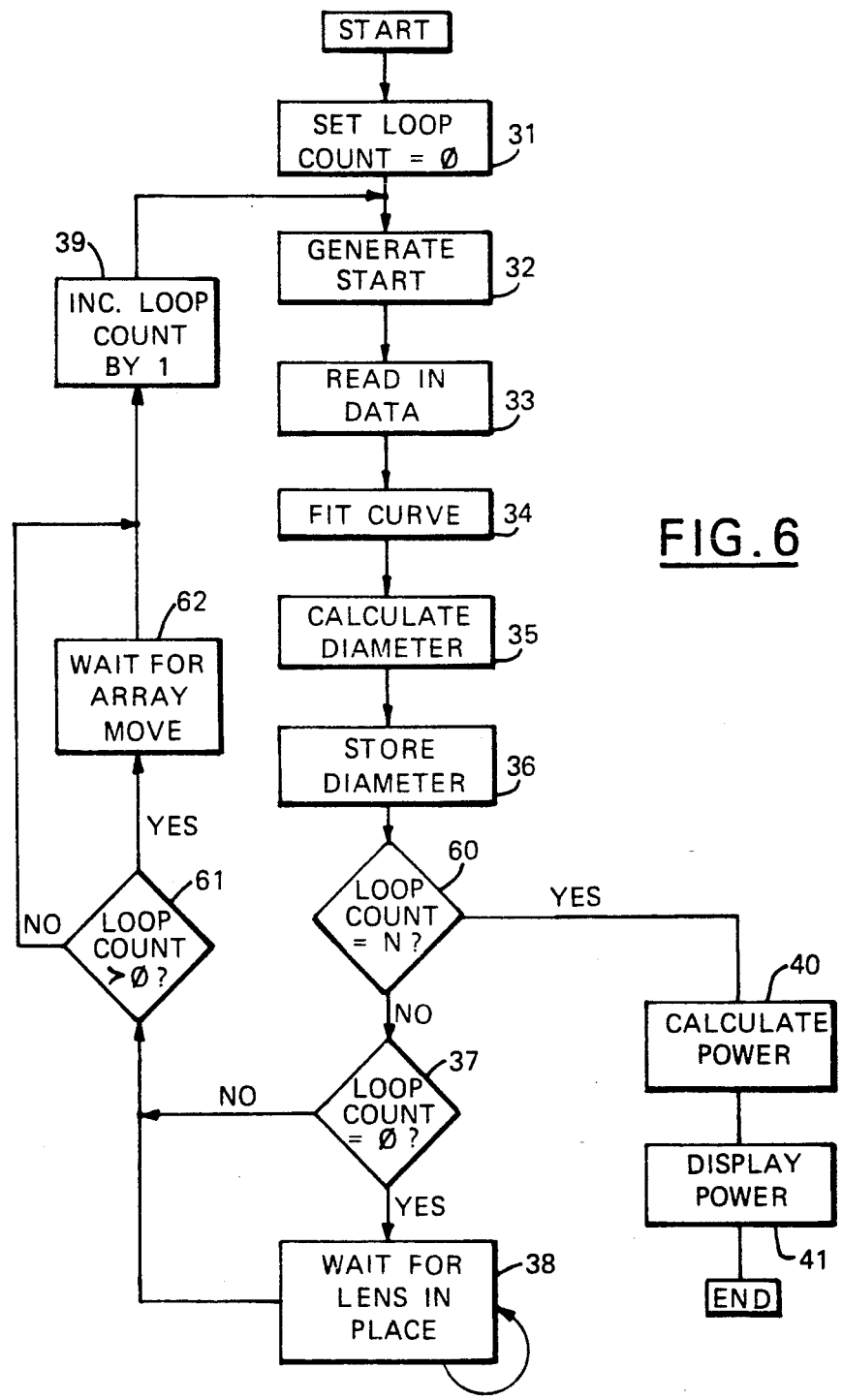

Embodiments of the invention will now be described, by way of example, with reference to the accompanying drawings, in which:

FIG. 1 is a schematic diagram of an apparatus for carrying out a method according to the invention with the lens-carrying table in an initial position, FIG. 2 shows the apparatus of FIG. 1 with the lens-carrying table in a subsequent position, FIGS. 3A and 3B are plots of intensity against beam width both without and with the lens in the beam path, FIGS. 4A and 4B show alternative collimated light sources for the apparatus, FIG. 5 is a flow diagram of a first computer program for calculating the lens power, and FIG. 6 is a flow diagram of a second computer program for calculating the lens power.

Referring first to FIG. 1, and X-Y table 10 is mounted for controllable movement in a horizontal plane a known distance L, typically about 10 cm, above an opto-electronic transducer in the form of a linear array 11 of photodiodes. The array 11 may be a 512 element G Series Solid State Line Scanner as marketed by EG&G Reticon of Sunnyvale, Calif., USA. This comprises 512 individual photodetectors each 25 $\mu$m in size and 25 $\mu$m apart.

A vertical beam 12 of collimated light of circular cross-section is produced by a source 13 which may be an He—Ne (helium-neon) laser. The collimated beam 12 is a few millimeters in diameter (width). The X-Y table 10 has an aperture 14 therein, and the table is initially positioned as shown in FIG. 1 so that the beam 12 passes without obstruction through the aperture 14 to fall on the array 11. The array 11 is positioned to lie precisely on the diameter of the beam 12.

The X-Y table 10 has a further aperture 15 which supports a contact lens 16 whose power is to be measured, and the table may be moved to insert the lens 16 into the path of the beam 12. For a divergent lens the effect is shown schematically at FIG. 2, in which it will be seen that the diameter of the beam 12 is greater at the array 11.

As will be described more fully, the purpose of the apparatus as to measure the diameter of the beam 12 both with and without the lens 16 inserted in its path, and to calculate in a microcomputer 17 the power of the lens 16.

For a divergent lens 16 the power is given by:

$$P = 1/L(1 - W/w) \quad \text{(equ.1)}$$

where:
P = power of lens 16 in diopters,
L = spacing between table 10 and array 11,
w = diameter of beam 12 without lens 16 inserted, and
W = diameter of beam 12 at array 11 with lens 16 inserted.

For a convergent lens where L < focal length the power is given by:

$$P = 1/L(1 + W/w) \quad \text{(equ.2)}$$

As is conventional, since the He—Ne beam 12 has a Gaussian intensity distribution, the diameters w and W of the beam are taken as the distance between the half-amplitude points.

For example, FIGS. 3A and 3B are typical plots of intensity against beam diameter both without and with the lens in the base path respectively. In FIG. 3A the diameter w of the undiverged collimated beam is 2.671 mm, and in FIG. 3B the diameter W of the divergent beam at the array is 3.627 mm.

Returning to FIG. 1, each individual photodetector in the linear array 11 samples the light falling on it and stores an electrical charge whose magnitude is substantially proportional to the intensity of the light at that point.

Upon the occurrence of a START signal supplied by the microcomputer 17, these stored charges are read out in succession under the control of and in synchronism with CLOCK signals, derived by division of the basic microcomputer clock in a divider 18. The output signal from the array 11, which is a succession of analog values representing the intensity of the light across the diameter of the beam 12, is amplified in an amplifier 19, and then each analog value is analog-to-digital converted in an A/D converter 20 also controlled by the CLOCK signals.

The resulting digital signal, which consists of a succession of individual digital values corresponding to the original analog values, is loaded into the memory of the computer 17.

It will be appreciated that the details of the interface circuitry, comprising the divider 18, amplifier 19 and A/D converter 20, located between the computer 17 and the array 11 will depend upon the make and model of computer, and that the foregoing is not intended to be a complete description of the interface. However, the functions described are relatively simple, and well within the competence of one skilled in the art.

Although the light source 13 has been described as an He—Ne laser, which automatically produces collimated light, a GaAs semiconductor laser 21, FIG. 4A, can be used provided a lens 22 is used to collimate the light. Even a white light source from a bulb 23, FIG. 4B, can be used. In this case the light from the lens 23 is coupled via a lens 24 into one end of an optical fibre 25 to give a well-defined spot emerging from the other end which can then be collimated by a second lens 26.

The GaAs light has a Gaussian distribution like the He—Ne laser light, whereas the white light has a $\cos^2$ distribution. In either case, the diameter or width of the beam is taken between the half-amplitude points.

FIG. 5 is a flow diagram of a computer program, loaded in the computer 17, for performing the method according to the invention in conjunction with the apparatus of FIGS. 1 and 2 (it will be appreciated that the computer 17 and interface components 18 to 20 have been omitted from FIG. 2 for simplicity).

The method starts with the apparatus in the initial position of FIG. 1, i.e. with the collimated beam 12 passing through the aperture 14 and falling unobstructed onto the array 11.

When the program is invoked, the first step 31 is to set a loop count to zero. Next, the computer is instructed to generate a START signal, step 32, in response to which the array 11 is read and the resulting data loaded into the computer memory, step 33, after amplification and A/D conversion as previously described.

Next, a curve fitting technique is used, step 34, which fits the best Gaussian or $\cos^2$ curve (according to the type of source 13) to the individual digital values read into the computer memory in step 33. Such curve-fitting techniques are well known in computer programming. This is followed at step 35 by calculating the diameter w of the collimated beam from the half-amplitude points, which is also a well-known technique, and storing the diameter so calculated, step 36.

Next, the program tests for a loop count=0, step 37. Since this is the first time around the lop the answer is YES, so the program waits (step 38) until the lens 16 is inserted into the beam 12.

The lens 16 is moved into the path of the beam 12 by moving the X-Y table 10. The position is shown in FIG. 2. When the lens is in position this is indicated to the program by a pre-defined input on, e.g. the computer keyboard (not shown). It is to be understood, however, that the computer program could itself control the table 10 to bring the lens 16 into place in the beam 12.

Now the loop count is incremented by 1 (step 39), whereupon steps 32 to 36 are repeated for the lens in place between the source 13 and the array 11 (FIG. 2). This time the diameter stored at step 36 is W, the diameter of the divergent beam at the array 11.

This time round the answer to the test at step 37 is NO, so at step 40 the power of the lens 16 is calculated according to equation 1 above, it being assumed that the value for L, the table/array spacing, has already been measured and entered.

Finally, the calculated power is displayed, step 41. This can either be a print out and/or a VDU display.

Naturally, in the case of a convergent lens 16, equation 2 above would be used in the calculation at step 40, instead of equation 1. In either case, the programming techniques are simple.

An alternative method according to the invention involves successively incrementing the distance L between the lens 16 and the array 11 while these elements are in the position of FIG. 2.

For an incremental change dL in L leading to an incremental change dW in W, one way write equation 1 as:

$$P=[1/(L+dL)][1-(W+dW)/w] \qquad \text{(equ.3)}$$

By plotting $[1-W/w]$ against dL for various values of dL, one obtains a straight line graph whose slope is the power P.

FIG. 6 shows a flow diagram of a program which will implement this technique. In FIG. 6, the same reference numerals have been used for steps which are the same as that shown in FIG. 5. The additional steps are decision steps 60 and 61, and a wait step 62.

On the first time round the loop the computer calculates and stores the unobstructed collimated beam diameter w, and on the second time round the computer calculates and stores the divergent diameter W. This is as before.

However, by inspection it will be seen that step 60 forces (N−1) further iterations round the loop, and that prior to the third and successive iterations step 61 forces the program to wait for a signal that the array 11 has been moved, step 62.

This refers to movement of the array 11 in a vertical direction by a pre-determined fixed amount, whereby the lens/array separation L is incremented for each of the (N−1) iterations around the loop after the second.

This incremental movement, which corresponds to increasing values of dL in equation 3, may be effected manually by mounting the array 11 on a vertically movable table (not shown) and signalling to the computer program each time that the array has been moved by entering a pre-determined keyboard input. However, the array may be moved under computer control.

Thus, the program will loop N+1 times until the loop count equals N, whereupon the power will be calculated in step 40. In this case the calculation will be according to equation 3, i.e. the computer will calculate the slope of $(1-W/w)$ against dL. The advantage of this technique is that it is unnecessary to know L.

If desired the change in vertical separation between the lens 16 and the array 11 could be achieved by moving the table 10 rather than the array 11. Thus the table 10 could be designed as an X-Y-Z table.

Variations and enhancements of the foregoing are possible. For example, the technique can be readily incorporated into an automated inspection line.

In such case the table 10 would hold a large number of lenses to be measured, and these would be automatically and successively brought into the path of the beam after the initial measurement for the unobstructed beam width w had been made. The modification to the flow diagrams to achieve this would be simple.

Further, instead of using a linear array 11 for the opto-electronic transducer one could use a two-dimensional array. This would obviate the need to manually locate the array 11 precisely on the beam diameter, since by using a two-dimensional array the beam diameter could be automatically determined by taking the greatest beam dimension detected by all the rows of photodetectors in the array.

In other words, steps 34 and 35 of the flow diagrams would be performed separately for the data obtained from each row of the two-dimensional array, and the true diameter stored in step 36 would be the largest figure for diameter obtained.

It will be appreciated that the beam of light does not necessarily have to be circular in cross-section and may be of any other suitable cross-sectional shape, for example oval or rectangular shape.

The invention is not limited to the embodiments described herein which may be modified or varied without departing from the scope of the invention.

What is claimed is:

1. A method for measuring the power of a lens, comprising the following steps:
   (a) providing an unobstructed collimated beam of light to an opto-electronic transducer,
   (b) sampling the beam with said opto-electronic transducer to produce an output signal representing the intensity of light across the width of said collimated beam of light,
   (c) converting the transducer output signal to digital form and loading the resulting digital signal into a computer memory,
   (d) inserting a lens into the path of said collimated beam of light,
   (e) repeating steps (b) and (c) with the lens thus inserted into said beam for at least one separation distance, L, between said lens and said transducer, and
   (f) calculating the power of said lens from the digital signals stored in the computer memory.

2. A method according to claim 1, wherein step (e) is repeated for a plurality of different separation distances between the lens and the transducer.

3. A method according to claim 1 or 2, wherein the opto-electronic transducer comprises a linear array of photodetectors.

* * * * *

UNITED STATES PATENT AND TRADEMARK OFFICE
CERTIFICATE OF CORRECTION

PATENT NO. : 5,123,735
DATED : Jun. 23, 1992
INVENTOR(S) : John Hegarty

It is certified that error appears in the above-identified patent and that said Letters Patent is hereby corrected as shown below:

Column 2, line 2, change "as" to -- is --

Column 3, line 32, change "lop" to -- loop --

Signed and Sealed this

Tenth Day of August, 1993

Attest:

MICHAEL K. KIRK

Attesting Officer     Acting Commissioner of Patents and Trademarks